United States Patent
Kolluri et al.

(10) Patent No.: US 10,484,836 B2
(45) Date of Patent: Nov. 19, 2019

(54) TECHNIQUES AND APPARATUSES FOR LONG TERM EVOLUTION IDLE-MODE AND ENHANCED MULTIMEDIA BROADCAST AND MULTICAST SERVICE CONCURRENCY OPERATION

(71) Applicant: QUALCOMM Incorporated, San Diego, CA (US)

(72) Inventors: Anand Chowdhary Kolluri, San Diego, CA (US); Harinath Reddy Patel, Mahabubnagar (IN); Ravi Kanth Kotreka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 15/602,888

(22) Filed: May 23, 2017

(65) Prior Publication Data

US 2018/0343546 A1 Nov. 29, 2018

(51) Int. Cl.

| H04W 4/06 | (2009.01) |
|---|---|
| H04W 24/08 | (2009.01) |
| H04W 68/00 | (2009.01) |
| H04W 8/18 | (2009.01) |
| H04W 76/27 | (2018.01) |
| H04W 84/12 | (2009.01) |
| H04B 7/0413 | (2017.01) |

(52) U.S. Cl.
CPC .............. *H04W 4/06* (2013.01); *H04W 8/18* (2013.01); *H04W 24/08* (2013.01); *H04W 68/00* (2013.01); *H04W 76/27* (2018.02); *H04B 7/0413* (2013.01); *H04W 84/12* (2013.01)

(58) Field of Classification Search
CPC .............. H04W 4/06; H04W 52/0219; H04W 52/0216; H04W 76/27; H04W 8/18; H04W 68/00; H04W 24/08; H04W 84/12; H04W 88/06; H04W 48/16; H04B 7/0413
See application file for complete search history.

(56) References Cited

U.S. PATENT DOCUMENTS

| 8,638,706 | B2 | 1/2014 | Cai et al. | |
|---|---|---|---|---|
| 9,119,145 | B2 | 8/2015 | Shousterman et al. | |
| 2011/0103288 | A1* | 5/2011 | Lee ...................... | H04W 48/12 370/312 |
| 2011/0199915 | A1* | 8/2011 | Santhanam ........... | H04W 68/00 370/252 |
| 2012/0276933 | A1* | 11/2012 | Laitinen .............. | H04W 68/025 455/458 |
| 2013/0044609 | A1* | 2/2013 | Chen ...................... | H04W 4/60 370/252 |

(Continued)

FOREIGN PATENT DOCUMENTS

WO    WO-2011050996 A1    5/2011

*Primary Examiner* — Ivan O Latorre
(74) *Attorney, Agent, or Firm* — Harrity & Harrity, LLP

(57) ABSTRACT

Certain aspects of the present disclosure generally relate to wireless communication. In some aspects, a user equipment (UE) may determine, that the UE is registered for a voice-over wireless local area network (WLAN) service; and forgo, based at least in part on determining that the UE is registered for the voice-over WLAN service, waking up to perform a long term evolution (LTE) idle-mode operation, wherein the LTE idle-mode operation includes monitoring for a page during a paging occasion. Numerous other aspects are provided.

30 Claims, 9 Drawing Sheets

(56) References Cited

U.S. PATENT DOCUMENTS

| | | | |
|---|---|---|---|
| 2014/0119265 A1* | 5/2014 | Shauh | H04W 4/06 |
| | | | 370/312 |
| 2015/0282208 A1 | 10/2015 | Yi et al. | |
| 2015/0350983 A1* | 12/2015 | Kwok | H04L 65/1069 |
| | | | 370/331 |
| 2016/0044578 A1 | 2/2016 | Vajapeyam et al. | |
| 2016/0366721 A1* | 12/2016 | Song | H04W 52/0225 |

* cited by examiner

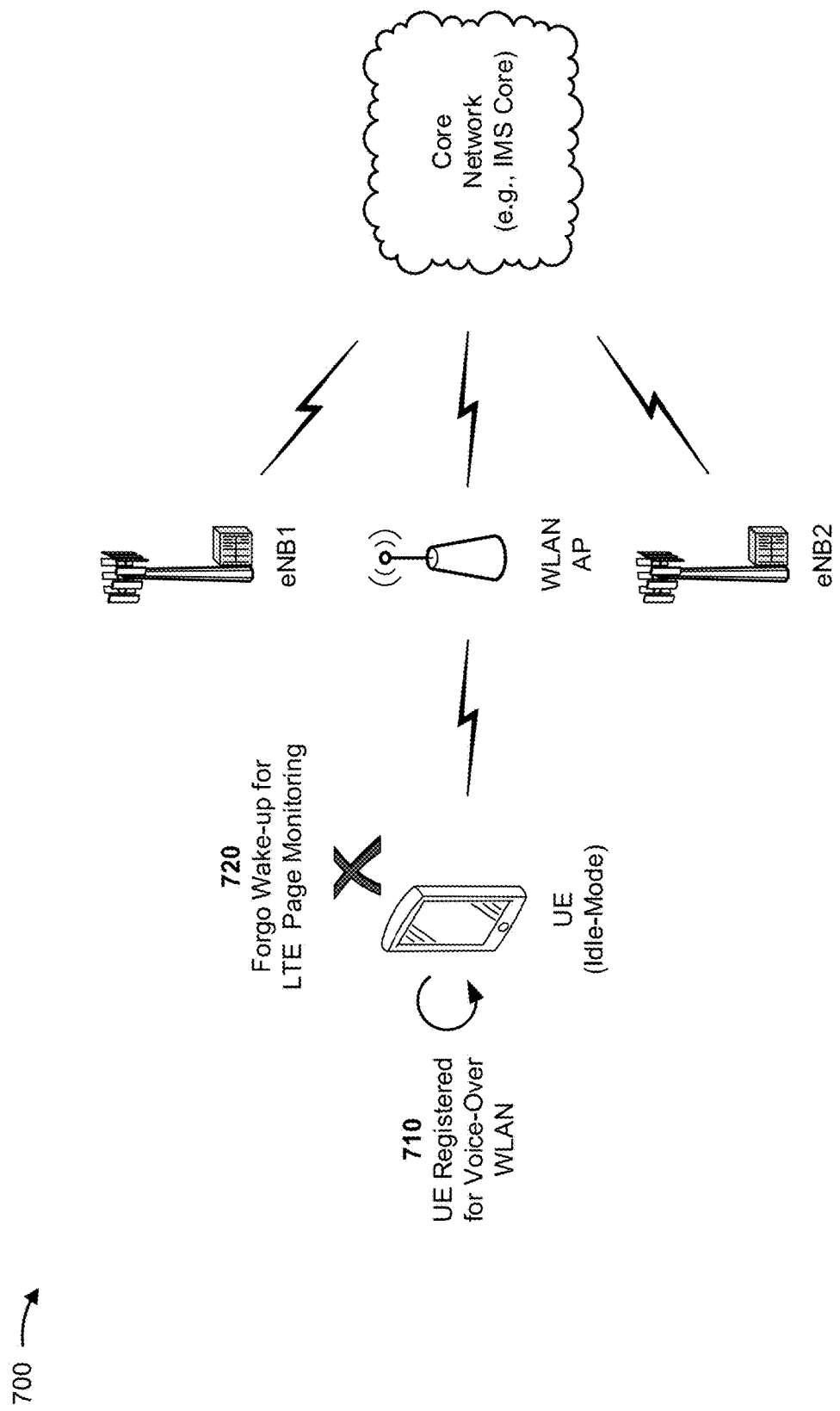

TECHNIQUES AND APPARATUSES FOR LONG TERM EVOLUTION IDLE-MODE AND ENHANCED MULTIMEDIA BROADCAST AND MULTICAST SERVICE CONCURRENCY OPERATION

FIELD OF THE DISCLOSURE

Aspects of the present disclosure generally relate to wireless communication, and more particularly to techniques and apparatuses for long term evolution (LTE) idle-mode and enhanced multimedia broadcast and multicast service (eMBMS) concurrency operation.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining, by a user equipment (UE), that the UE is registered for a voice-over wireless local area network (WLAN) service; and forgoing, by the UE and based at least in part on determining that the UE is registered for the voice-over WLAN service, waking up (e.g., determining, by the UE and based at least in part on determining that the UE is registered for the voice-over WLAN service, not to wake up) to perform a long term evolution (LTE) idle-mode operation, wherein the LTE idle-mode operation includes monitoring for a page during a paging occasion.

In some aspects, a UE may include a memory and one or more processors operatively coupled to the memory. The one or more processors may be configured to determine that the UE is registered for a voice-over WLAN service; and forgo, based at least in part on determining that the UE is registered for the voice-over WLAN service, waking up (e.g., determine, based at least in part on determining that the UE is registered for the voice-over WLAN service, not to wake up) to perform a LTE idle-mode operation, wherein the LTE idle-mode operation includes monitoring for a page during a paging occasion.

In some aspects, a non-transitory computer-readable medium may store one or more instructions for wireless communication. The one or more instructions, when executed by one or more processors of a wireless communication device, may cause the one or more processors to determine that the wireless communication device is registered for a voice-over WLAN service; and forgo, based at least in part on determining that the wireless communication device is registered for the voice-over WLAN service, waking up (e.g., determining, based at least in part on determining that the wireless communication device is registered for the voice-over WLAN service, not to wake up) to perform a LTE idle-mode operation, wherein the LTE idle-mode operation includes monitoring for a page during a paging occasion.

In some aspects, an apparatus for wireless communication may include means for determining that the apparatus is registered for a voice-over WLAN service; and means for forgoing, based at least in part on determining that the apparatus is registered for the voice-over WLAN service, waking up (e.g., determining, based at least in part on determining that the apparatus is registered for the voice-over WLAN service, not to wake up) to perform a LTE idle-mode operation, wherein the LTE idle-mode operation includes monitoring for a page during a paging occasion.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating an example of a UE forgoing a wake-up, associated with performing a LTE idle-mode operation, when the UE is registered for a voice-over WLAN service, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
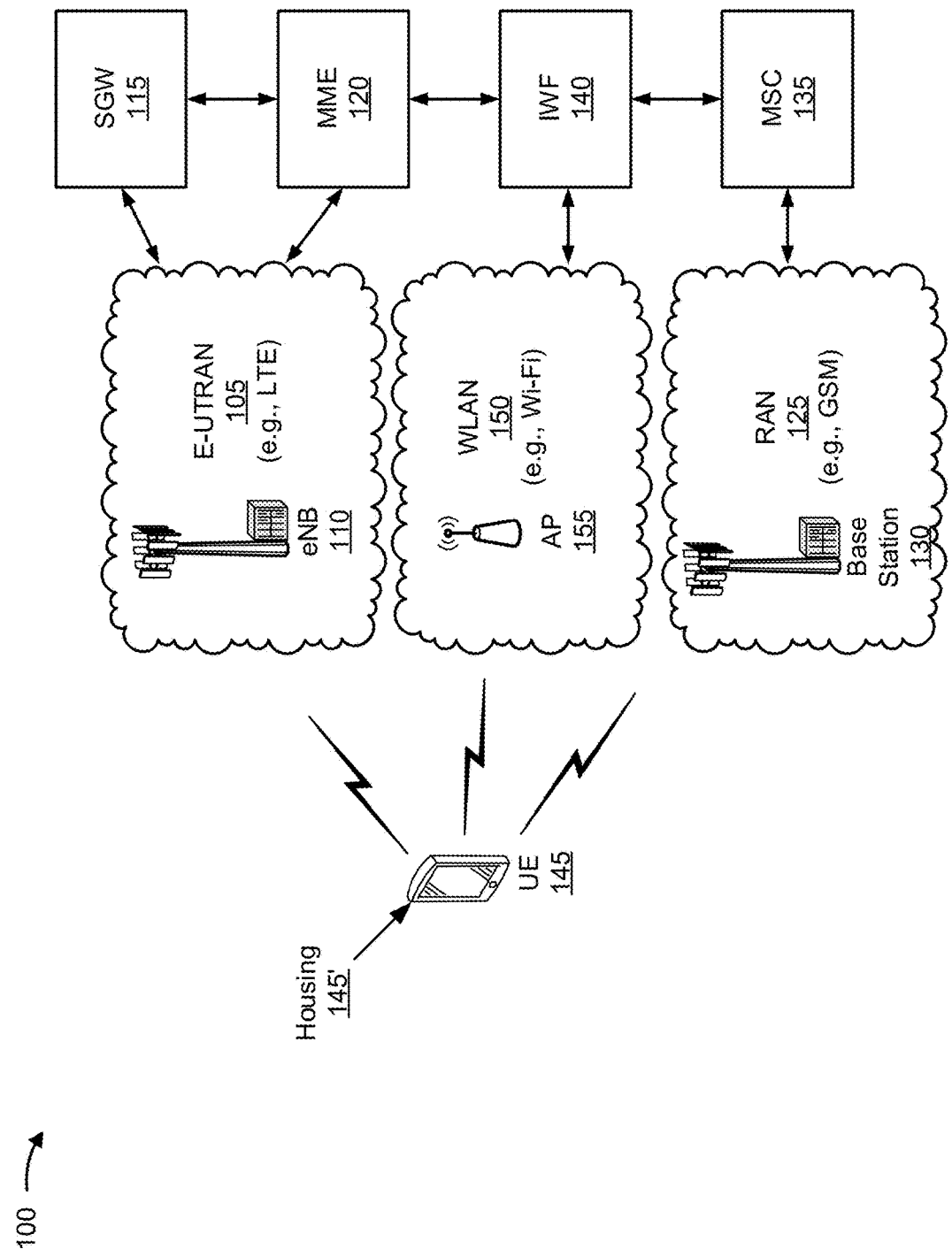
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include a wireless local area network (WLAN) 150, which may include one or more access points (APs) 155 (e.g., one or more Wi-Fi access points), and which may communicate with other devices or networks via IWF 140 (e.g., one or more devices included in an IMS core associated with a core network). As further shown, example deployment 100 may include one or more user equipment (UEs) 145 capable of communicating via E-UTRAN 105, RAN 125, and/or WLAN 150.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of a LTE network) or another type of base station associated with a different type of RAT.

With reference to WLAN 150 of example deployment 100, APs 155 may wirelessly communicate with UEs 145 via one or more WLAN access point antennas, over one or more communication links. In some examples, APs 155 may communicate with UEs 145 using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac). In some aspects, WLAN 150 may support a voice-over WLAN service, whereby UEs 145 receive voice calls via WLAN 150 (e.g., rather than E-UTRAN 105 or RAN 125), as described below.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle-mode and camp on the serving network if active communication is not required by UE 145.

UE 145 may operate in the idle-mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle-mode, such as a neighbor list included in a system information block type 5 (SIB 5) provided by an eNB of a RAT on which UE 145 is camped.

Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
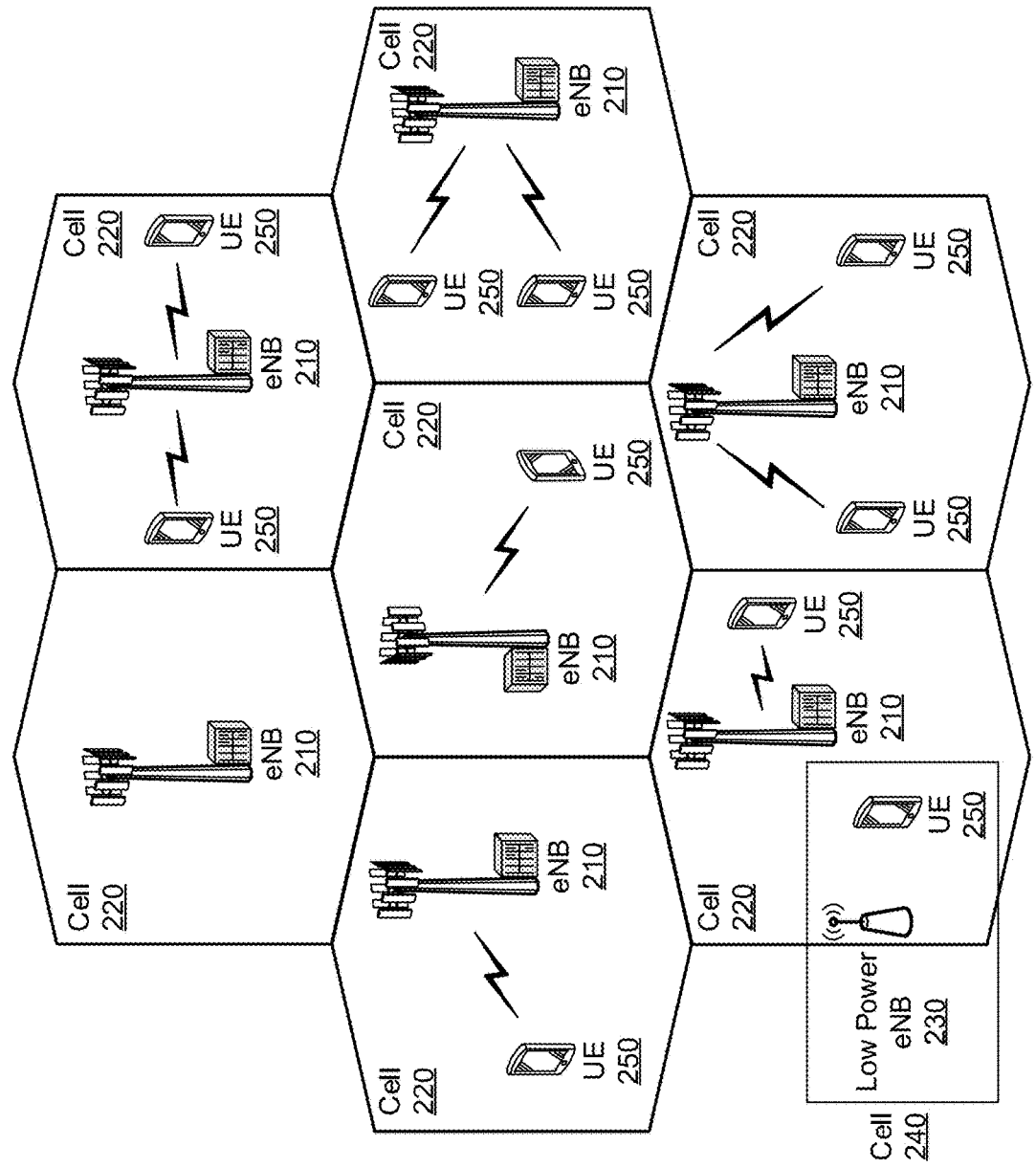
FIG. 2 is a diagram illustrating an example access network in a LTE network architecture, in accordance with various aspects of the present disclosure.

FIG. 2 is a diagram illustrating an example access network 200 in a LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
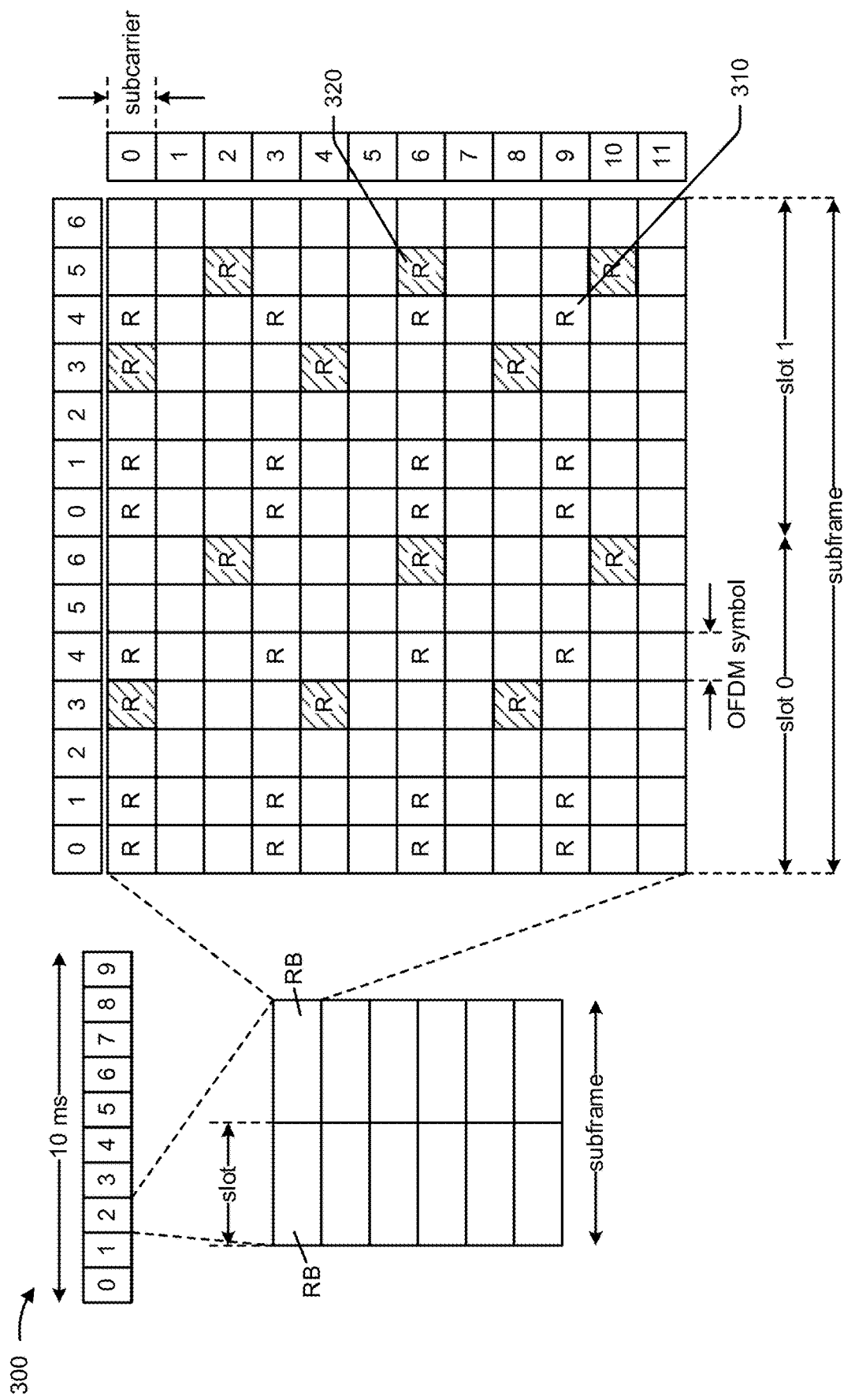
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
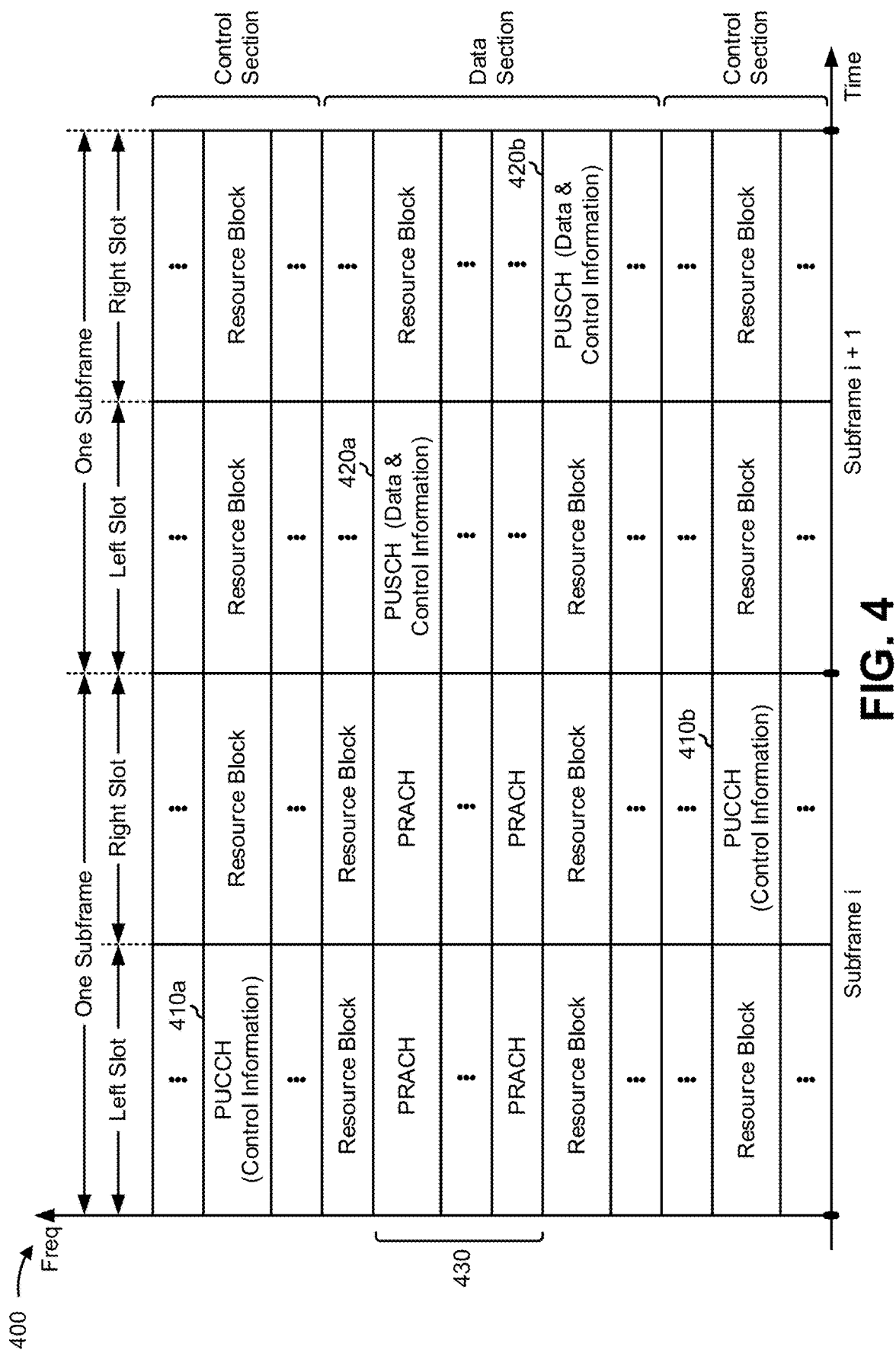
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
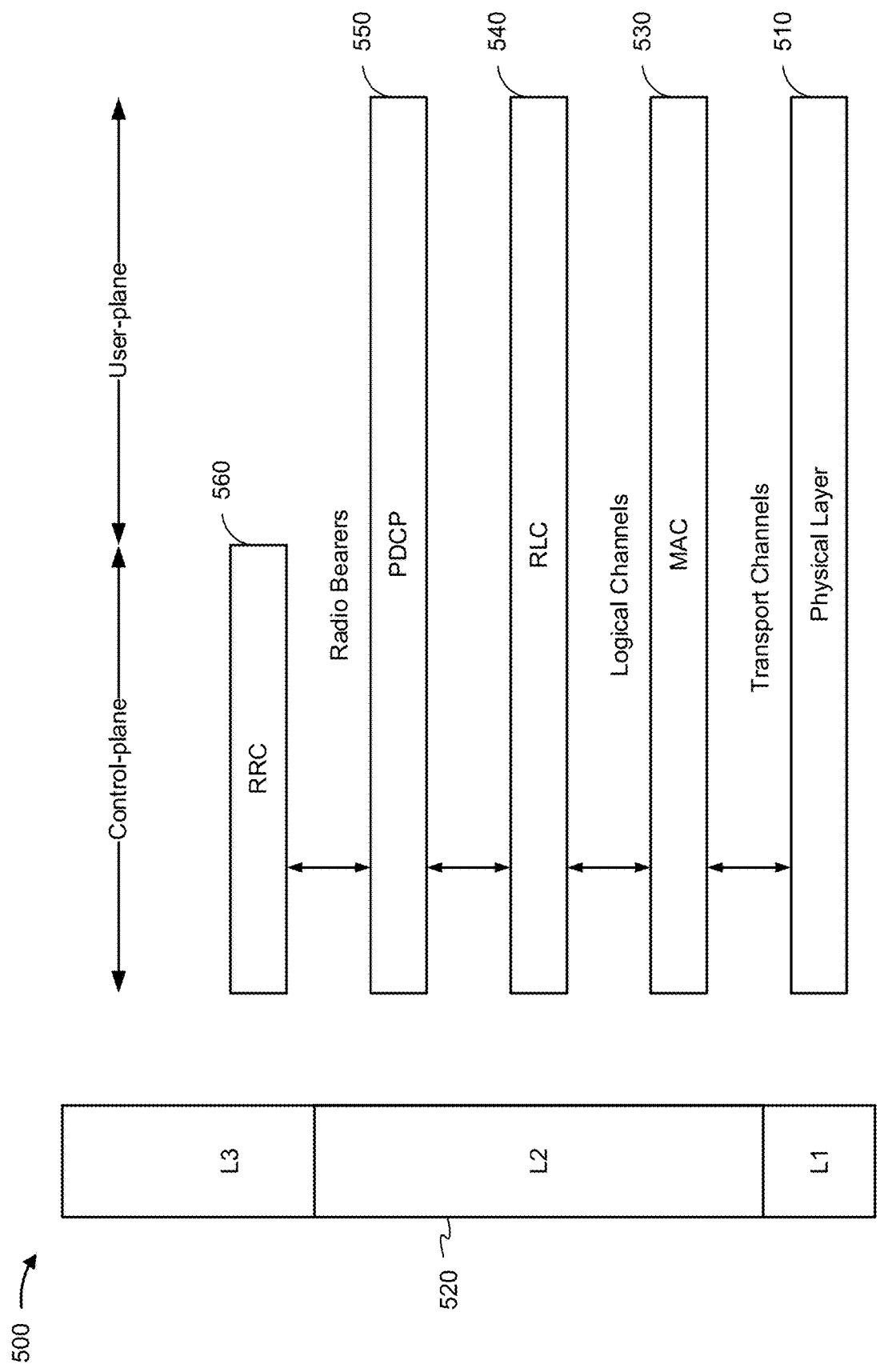
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer MO.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
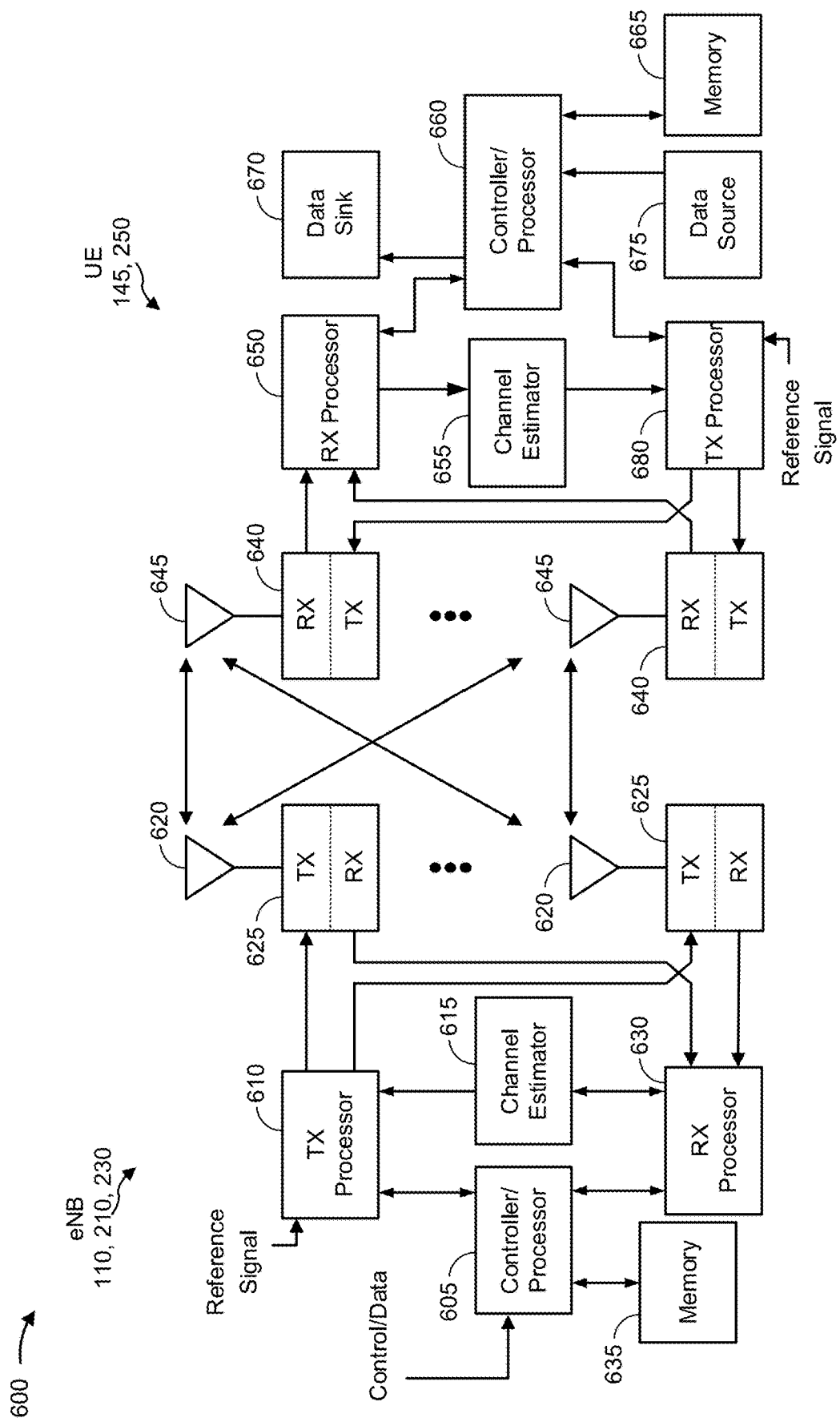
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform LTE idle-mode and eMBMS concurrency operation, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform example process 800 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A UE operating in a LTE idle-mode may be capable of receiving a call (e.g., a voice call) via a radio access network, such as a LTE network. For example, the UE, while operating in the LTE idle-mode, may be configured to periodically (e.g., at intervals of time corresponding to a DRX cycle) wake from the LTE idle-mode in order perform a LTE idle-mode operation associated with monitoring for a page indicating an incoming voice call. If a page is received during this wake-up, then the UE may establish a connection with the LTE network, and receive one or more messages, associated with initiating the call (e.g., one or more session initiation protocol (SIP) messages), after establishing the connection. If no page is received during the wake-up, then the UE may return to the LTE idle-mode until a next periodic wake-up. During a given wake-up from the LTE idle-mode, the UE may also perform one or more other LTE idle-mode operations, such as monitoring or measuring neighbor cells associated with the UE (e.g., in order to prepare for a potential handover).

The UE, while operating in the LTE idle-mode, may also be capable of receiving a call via a WLAN, such as a Wi-Fi network. For example, the UE may be connected to a WLAN and registered for a voice-over WLAN service (e.g., such that a connection is established between the UE and an evolved packet data gateway (ePDG), associated with a core network, via which the voice-over WLAN service is provided). Here, the UE may receive one or more messages, associated with a voice call (e.g., initiating a voice call) (e.g., one or more SIP messages), via a WLAN AP to which the UE is attached. Notably, when the UE is registered for the voice-over WLAN service, the UE need not wake from the LTE idle-mode in order to receive the one or more messages associated with the call. In other words, while registered for the voice-over WLAN service, the UE may receive messages, associated with a voice call (e.g., initiating incoming calls), via the WLAN (rather than the LTE network). Thus, the UE does not need to perform the LTE idle-mode operation associated with monitoring for pages while the UE 145, 250 is registered for the voice-over WLAN service to receive the one or more messages.

Some aspects described herein provide a UE capable of forgoing (e.g., skipping) a wake-up (e.g., determining not to wake up) from a LTE idle-mode, associated with monitoring for a page indicating an incoming voice call, when the UE is registered for a voice-over WLAN service. In some aspects, rather than waking from the LTE idle-mode (e.g., based at least in part on a DRX cycle) in order to perform one or more other LTE idle-mode operations (e.g., monitoring and/or measuring neighbor cells), the UE may perform the one or more other LTE idle-mode operations during a wake-up associated with receiving a transmission, such as an evolved Multimedia Broadcast and Multicast Service (eMBMS) transmission. Here, by aligning the performance of the one or more other LTE idle-mode operations with the reception of the transmission, a single wake-up from the LTE idle-mode is needed (rather than separate wake-ups for the reception of the transmission and the performance of the one or more other LTE idle-mode operations), thereby conserving battery power and/or processing resources of the UE.

Figure 7B:
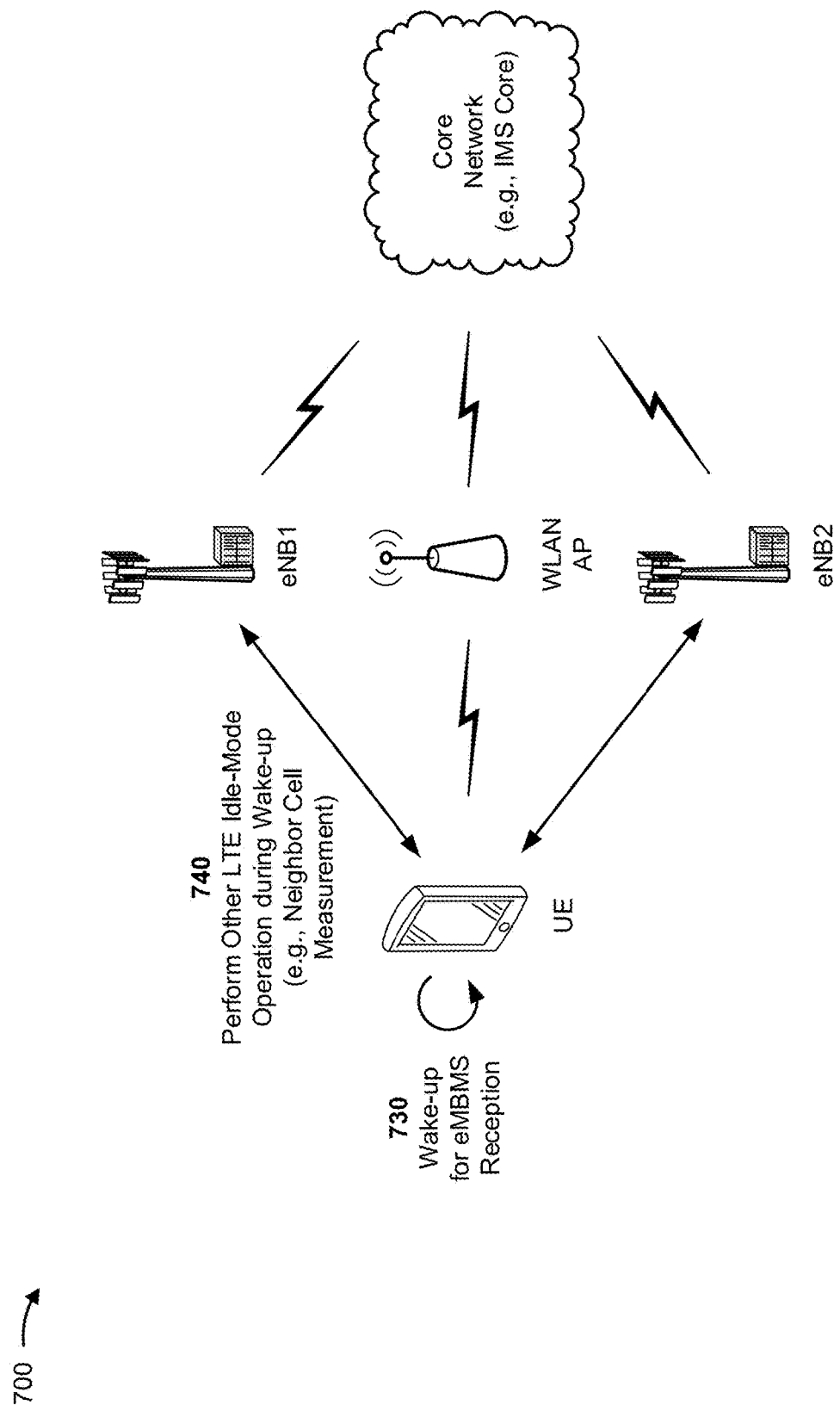

FIGS. 7A and 7B are diagrams illustrating an example 700 of a UE forgoing a wake-up (e.g., determining not to perform a wake up), associated with performing a LTE idle-mode operation, when the UE is registered for a voice-over WLAN service, in accordance with various aspects of the present disclosure. In FIG. 7A, the UE is operating in a LTE idle-mode, and is attached to a WLAN AP associated with a WLAN network (e.g., such that the UE can communicate with devices in an IMS core, associated with a core network via the WLAN). Here, assume that the UE is registered for a voice-over WLAN service such that a connection is established between the UE and an ePDG, associated with a core network, via which the voice-over WLAN service is provided.

As shown in FIG. 7A, and by reference number 710, the UE determines that the UE is registered for the voice-over WLAN service. For example, the UE may determine, based at least in part on information stored by or configured on the UE during registration for the voice-over WLAN service, that the UE is registered for the voice-over WLAN service.

As shown by reference number 720, based at least in part on determining that the UE is registered for the voice-over WLAN service, the UE forgoes (e.g., skips) a wake-up (e.g., determines not to perform a wake up) from the LTE idle-mode associated with monitoring for a page indicating an incoming voice call (sometimes referred to as a paging occasion). For example, as described above, the UE may be configured to periodically (e.g., based at least in part on a DRX cycle of 640 milliseconds (ms), 1.28 seconds, 2.56 seconds, and/or the like) wake from the LTE idle-mode in order to monitor for pages associated with incoming voice calls. However, as shown, based at least in part on the UE being registered for the voice-over WLAN service, the UE may forgo the wake-up from the LTE idle-mode for page monitoring. In some aspects, the UE may forgo a series of wake-ups (e.g., determines not to perform a series of wake-ups) from the LTE idle-mode (e.g., the UE may skip each page monitoring wake-up during a period of time that the UE is registered for the voice-over WLAN service).

For the purposes of FIG. 7B, assume that the UE is to wake from the LTE idle-mode in order to receive an eMBMS transmission associated with an eMBMS service. Here, the eMBMS transmission may be scheduled for a portion of a multicast control channel (MCCH) scheduling period associated with the eMBMS service (e.g., a portion of a MCCH scheduling period (MSP) with a length of 80 ms, 160 ms, 320 ms, and/or the like). As part of the eMBMS service, the UE receives scheduling information that identifies the portion of the MSP during which the eMBMS transmission, to be received by the UE, will be transmitted. Thus, the UE has information that identifies a time at which the UE should wake form the LTE idle-mode in order to receive the eMBMS transmission.

As shown by FIG. 7B, and by reference number 730, the UE wakes from the LTE idle-mode in order to receive the eMBMS transmission as scheduled during the MSP. The UE may receive, based at least in part on waking from the LTE idle-mode, the eMBMS transmission during the MSP.

As shown by reference number 740, during the wake-up associated with receiving the eMBMS transmission, the UE may perform one or more other LTE idle-mode operations (e.g., the UE may perform the one or more other LTE idle-mode operations during the MSP). For example, as shown, the UE may monitor and/or measure one or more neighbor cells (e.g., as part of one or more LTE idle-mode operations) during the wake-up associated with the reception of the eMBMS transmission. In some aspects, the one or more other LTE idle-mode operations may include one or more LTE idle-mode operations that the UE would typically perform during a wake-up associated with monitoring for pages indicating incoming voice calls associated with the LTE network.

In some aspects, the UE may perform the one or more other LTE idle-mode operations before receiving the eMBMS transmission. For example, the UE may wake from the LTE idle-mode before the scheduled eMBMS transmission, perform the one or more other LTE idle-mode operations, and then receive the eMBMS transmission before re-entering the LTE idle-mode. In some aspects, the UE may perform the one or more other LTE idle-mode operations after receiving the eMBMS transmission. For example, the UE may wake from the LTE idle-mode at the time of the scheduled eMBMS transmission, receive the eMBMS transmission, and then perform the one or more other LTE idle-mode operations before re-entering the LTE idle-mode.

In some aspects, the UE may perform the one or more other LTE idle mode operations before and after receiving the eMBMS transmission. For example, the UE may wake from the LTE idle-mode before the scheduled eMBMS transmission, perform a first LTE idle-mode operation, receive the eMBMS transmission, and then perform a second LTE idle-mode operation before re-entering the LTE idle-mode.

In some aspects, the UE performs the one or more other LTE idle-mode operations while the UE is not receiving the eMBMS transmission (e.g., as described in the above examples). Additionally, or alternatively, the UE may perform the one or more LTE idle-mode operations concurrently with receiving the eMBMS transmission.

Here, by aligning the performance of the one or more other LTE idle-mode operations with the period for reception of the eMBMS transmission, a single wake-up from the LTE idle-mode is needed, thereby conserving battery power and/or processing resources of the UE.

In some aspects, in order to ensure that the UE does not miss a change to system information, the UE may read system information (e.g., system information block type 1 (SIB1)) during the wake-up associated with the reception of the eMBMS transmission. Typically, the UE would receive information indicating a modification to system information during a wake-up associated with the monitoring for a page indicating an incoming call. However, since the UE may forgo one or more of these wake-ups, as described herein, the UE may not receive such information in the typical manner.

In some aspects, the UE may receive information indicating a modification to system information during the wake-up for reception of the eMBMS transmission. For example, during initial attachment to the LTE network, the UE may receive information that identifies a periodicity at which system information, associated with the LTE network, may be modified (herein referred to as a system information modification period). Here, during a given system information modification period, a system information change that is to be implemented during an upcoming (e.g., next) system information modification period may be signaled (e.g., in SIB1) by the LTE network. Here, based at least in part on the information that identifies the system information modification period, the UE may identify a wake-up, associated with receiving an eMBMS transmission, that is at, near, or overlaps the end of a system information modification period. During this wake-up, the UE may read SIB1 in order to determine whether a change to system information will be implemented in an upcoming system information modification period. In some aspects, the UE may read a SIB1 at or near the end of the system information modification period (e.g., during a wake-up that coincides with a last SIB1 of the system information modification period) since the last SIB1 will reflect a modification of the system information during the system information modification period, if any. In this way, the UE may ensure that system information modifications are known to the UE, while forgoing a wake-up associated with performing page monitoring.

As indicated above, FIGS. 7A and 7B are provided as examples. Other examples are possible and may differ from what was described with respect to FIGS. 7A and 7B.

Figure 8:
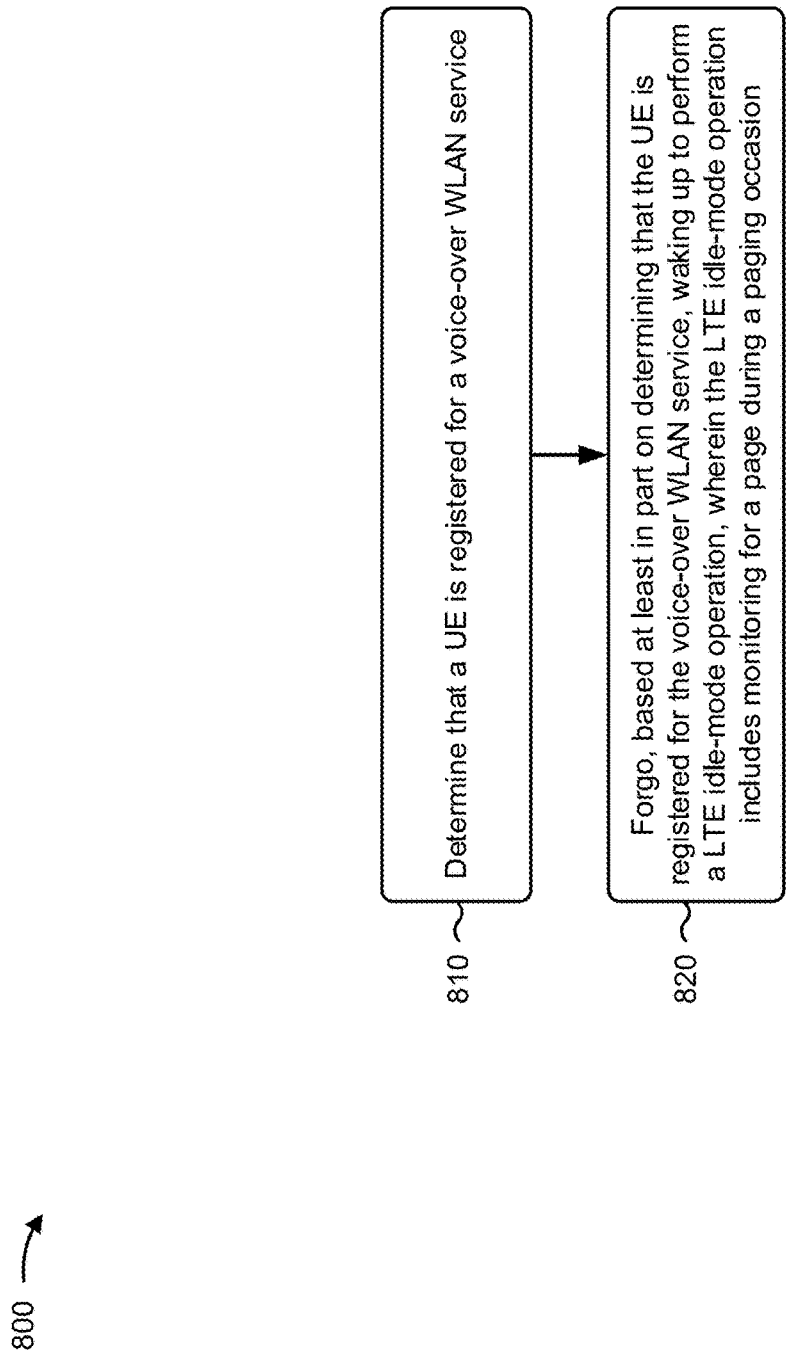
FIG. 8 is a diagram illustrating an example process performed, for example, by a wireless communication device, in accordance with various aspects of the present disclosure.

FIG. 8 is a diagram illustrating an example process 800 performed, for example, by a wireless communication device, in accordance with various aspects of the present disclosure. Example process 800 is an example where a wireless communication device (e.g., UE 145, 250) performs LTE and eMBMS concurrency operation.

As shown in FIG. 8, in some aspects, process 800 may include determining that a UE is registered for a voice-over WLAN service (block 810). For example, a UE may determine the UE is registered for a voice-over WLAN service, as described above.

As further shown in FIG. 8, in some aspects, process 800 may include forgoing, based at least in part on determining that the UE is registered for the voice-over WLAN service, waking up (e.g., determining not to perform a wake up) to perform a LTE idle-mode operation, wherein the LTE idle-mode operation includes monitoring for a page during a paging occasion (block 820). For example, the UE may forgo, based at least in part on determining that the UE is registered for the voice-over WLAN service, waking up (e.g., determine not to perform a wake up) to perform a LTE idle-mode operation, wherein the LTE idle-mode operation includes monitoring for a page during a paging occasion, as described above.

In some aspects, the UE may perform at least one other LTE idle-mode operation during a wake-up of the UE from the LTE idle-mode, wherein the wake-up is associated with receiving an eMBMS transmission. In some aspects, the at least one other LTE idle-mode operation may include an operation associated with at least one of monitoring for or measuring a neighbor cell. In some aspects, the at least one other LTE idle-mode operation may be aligned with a period for reception of the eMBMS transmission. In some aspects, the at least one other LTE idle-mode operation may be performed during a MCCH scheduling period associated with the eMBMS transmission. In some aspects, the at least one other LTE idle-mode operation may be performed during the MCCH scheduling period, associated with the eMBMS transmission, while the UE is not receiving eMBMS data.

In some aspects, the UE may be configured to read a system information block type 1 (SIB1) during a period for reception of an eMBMS transmission. In some aspects, the SIB1 may indicate whether a system information modification has occurred. In some aspects, the SIB1 may be included in a system information modification period. In some aspects, the SIB1 may be a last transmission in the system information modification period.

In some aspects, the UE may be configured to receive a transmission, associated with a voice call, via an access point associated with the voice-over WLAN service. In some aspects, the transmission, associated with the voice call, may include a session initiation protocol message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of wireless communication, comprising:
    determining, by a user equipment (UE), that the UE is registered for a voice-over wireless local area network (WLAN) service;
    forgoing, by the UE and based at least in part on determining that the UE is registered for the voice-over WLAN service, waking up to perform long term evolution (LTE) idle-mode operations,
        wherein the LTE idle-mode operations include monitoring for a page during a paging occasion and at least one other LTE idle-mode operation;
    waking up from an LTE idle-mode to receive an evolved Multimedia Broadcast and Multicast Service (eMBMS) transmission based on a scheduling period; and
    performing the at least one other LTE idle-mode operation, that was to be performed during the forgone waking up associated with monitoring for the page during the paging occasion, during the wake up associated with receiving the eMBMS transmission.

2. The method of claim 1, wherein the at least one other LTE idle-mode operation includes an operation associated with at least one of monitoring for or measuring a neighbor cell.

3. The method of claim 1, wherein the at least one other LTE idle-mode operation is aligned with a period for reception of the eMBMS transmission.

4. The method of claim 1, wherein the at least one other LTE idle-mode operation is performed during a multicast control channel (MCCH) scheduling period associated with the eMBMS transmission.

5. The method of claim 4, wherein the at least one other LTE idle-mode operation is performed during the MCCH scheduling period, associated with the eMBMS transmission, while the UE is not receiving eMBMS data.

6. The method of claim 1, wherein the UE is configured to read a system information block type 1 (SIB1) during a period for reception of the eMBMS transmission.

7. The method of claim 6, wherein the SIB1 indicates whether a system information modification has occurred.

8. The method of claim 6, wherein the SIB1 is included in a system information modification period.

9. The method of claim 8, wherein the SIB1 is a last transmission in the system information modification period.

10. The method of claim 1, wherein the UE is configured to receive a transmission, associated with a voice call, via an access point associated with the voice-over WLAN service.

11. The method of claim 10, wherein the transmission, associated with the voice call, includes a session initiation protocol message.

12. The method of claim 1, wherein forgoing, by the UE and based at least in part on determining that the UE is registered for the voice-over WLAN service, waking up includes determining, by the UE and based at least in part on determining that the UE is registered for the voice-over WLAN service, not to perform a wake up.

13. The method of claim 1, wherein the forgone waking up is a wake up based on a DRX cycle.

14. A user equipment (UE), comprising:
    a memory; and
    one or more processors operatively coupled to the memory, the one or more processors configured to:
        determine that the UE is registered for a voice-over wireless local area network (WLAN) service;
        forgo, based at least in part on determining that the UE is registered for the voice-over WLAN service, waking up to perform long term evolution (LTE) idle-mode operations,
            wherein the LTE idle-mode operations include monitoring for a page during a paging occasion and at least one other LTE idle-mode operation;
        wake up from an LTE idle-mode to receive an evolved Multimedia Broadcast and Multicast Service (eMBMS) transmission based on a scheduling period; and
        perform the at least one other LTE idle-mode operation, that was to be performed during the forgone wake up associated with monitoring for the page during the paging occasion, during the wake up associated with receiving the eMBMS transmission.

15. The UE of claim 14, wherein the at least one other LTE idle-mode operation includes an operation associated with at least one of monitoring for or measuring a neighbor cell.

16. The UE of claim 14, wherein the at least one other LTE idle-mode operation is aligned with a period for reception of the eMBMS transmission.

17. The UE of claim 14, wherein the at least one other LTE idle-mode operation is performed during a multicast control channel (MCCH) scheduling period associated with the eMBMS transmission.

18. The UE of claim 14, wherein the UE is configured to read a system information block type 1 (SIB1) during a period for reception of the eMBMS transmission.

19. The UE of claim 14, wherein the UE is configured to receive a transmission, associated with a voice call, via an access point associated with the voice-over WLAN service.

20. The UE of claim 14, wherein forgo, based at least in part on determining that the UE is registered for the voice-over WLAN service, waking up includes determine, based at least in part on determining that the UE is registered for the voice-over WLAN service, not to perform a wake up.

21. The UE of claim 14, wherein the forgone waking up is a wake up based on a DRX cycle.

22. A non-transitory computer-readable medium storing one or more instructions for wireless communication, the one or more instructions comprising:
one or more instructions that, when executed by one or more processors of a wireless communication device, cause the one or more processors to:
determine that the wireless communication device is registered for a voice-over wireless local area network (WLAN) service;
forgo, based at least in part on determining that the wireless communication device is registered for the voice-over WLAN service, waking up to perform long term evolution (LTE) idle-mode operations,
wherein the LTE idle-mode operations includes monitoring for a page during a paging occasion and at least one other LTE idle-mode operation;
wake up from an LTE idle-mode to receive an evolved Multimedia Broadcast and Multicast Service (eMBMS) transmission based on a scheduling period; and
perform the at least one other LTE idle-mode operation, that was to be performed during the forgone wake up associated with monitoring for the page during the paging occasion, during the wake up associated with receiving the eMBMS transmission.

23. The non-transitory computer-readable medium of claim 22, wherein the wireless communication device is configured to read a system information block type 1 (SIB1) during a period for reception of an eMBMS transmission.

24. The non-transitory computer-readable medium of claim 23, wherein the SIB1 indicates whether a system information modification has occurred.

25. The non-transitory computer-readable medium of claim 23, wherein forgo, based at least in part on determining that the wireless communication device is registered for the voice-over WLAN service, waking up includes determine, based at least in part on determining that the wireless communication device is registered for the voice-over WLAN service, not to perform a wake up.

26. The non-transitory computer-readable medium of claim 22, wherein the wireless communication device is configured to receive a transmission, associated with a voice call, via an access point associated with the voice-over WLAN service.

27. The non-transitory computer-readable medium of claim 22, wherein the forgone waking up is a wake up based on a DRX cycle.

28. An apparatus for wireless communication, comprising:
means for determining that the apparatus is registered for a voice-over wireless local area network (WLAN) service;
means for forgoing, based at least in part on determining that the apparatus is registered for the voice-over WLAN service, waking up to perform a long term evolution (LTE) idle-mode operations,
wherein the LTE idle-mode operations include monitoring for a page during a paging occasion and at least one other LTE idle-mode operation;
means for waking up from an LTE idle-mode to receive an evolved Multimedia Broadcast and Multicast Service (eMBMS) transmission based on a scheduling period; and
means for performing the at least one other LTE idle-mode operation, that was to be performed during the forgone waking up associated with monitoring for the page during the paging occasion, during the wake up associated with receiving the eMBMS transmission.

29. The apparatus of claim 28, further comprising means for determining, based at least in part on determining that the apparatus is registered for the voice-over WLAN service, not to perform a wake up.

30. The apparatus of claim 28, wherein the forgone waking up is a wake up based on a DRX cycle.

* * * * *